United States Patent [19]

Hofmann

[11] 4,181,040

[45] Jan. 1, 1980

[54] INFINITELY VARIABLE SPEED GEAR DRIVE

[75] Inventor: Hans Hofmann, Munich, Fed. Rep. of Germany

[73] Assignee: Getrag Getriebe- und Zahnradfabrik GmbH, Fed. Rep. of Germany

[21] Appl. No.: 842,243

[22] Filed: Oct. 14, 1977

[30] Foreign Application Priority Data

Oct. 20, 1976 [DE] Fed. Rep. of Germany ....... 2647240

[51] Int. Cl.² ............................................. F16H 47/08
[52] U.S. Cl. ........................................ 74/677; 74/687; 74/688
[58] Field of Search .................. 74/677, 687, 688, 793

[56] References Cited

U.S. PATENT DOCUMENTS

| | | | |
|---|---|---|---|
| 3,073,182 | 1/1963 | Harmon .................... | 74/677 |
| 3,500,704 | 3/1970 | Muller et al. ................ | 74/677 X |
| 3,713,353 | 1/1973 | Scheiter .................... | 74/677 X |
| 3,748,924 | 7/1973 | Cross et al. ................ | 74/677 |
| 3,777,593 | 12/1973 | Mooney, Jr. et al. ......... | 74/687 |
| 3,851,544 | 12/1974 | Herman .................... | 74/677 |
| 3,905,251 | 9/1975 | Greene .................... | 74/687 |
| 4,014,222 | 3/1977 | Brandt .................... | 74/687 |

FOREIGN PATENT DOCUMENTS 568719 4/1928 Fed. Rep. of Germany ............ 74/793

*Primary Examiner*—Lance Chandler

[57] ABSTRACT

Infinitely variable speed ratio gear drive with reversible output-end direction of rotation, featuring a mechanical power train and a further power train incorporating an infinitely variable and reversible torque transmitting unit which preferably comprises a hydrostatic pump and hydrostatic motor. The two power trains are re-joined in a planetary gear train, with the mechanical power train delivering its power to the sun gear and the further power train delivering its power to the internal gear via an intermediate transmission and the planet carrier being connected to the output. A third power train with a hydrodynamic converter which also delivers its power to the internal gear can be provided in addition.

4 Claims, 1 Drawing Figure

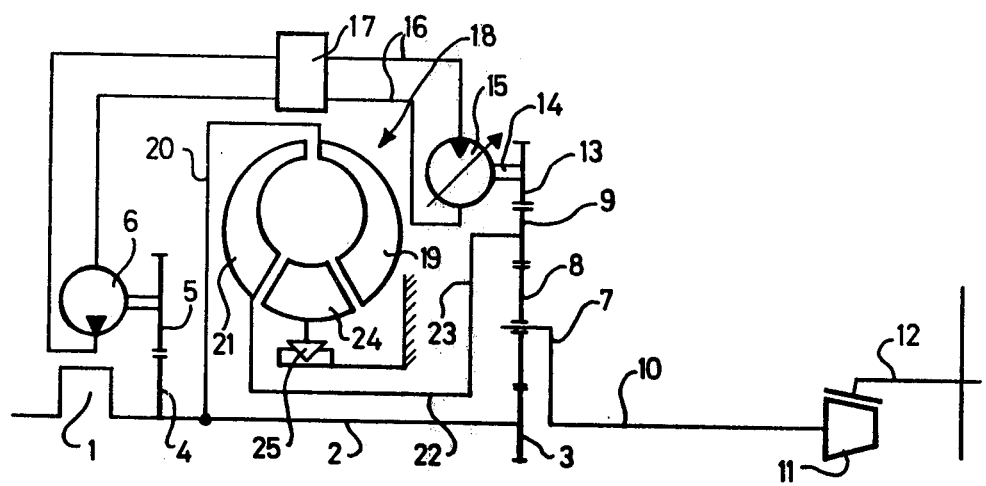

INFINITELY VARIABLE SPEED GEAR DRIVE

The present invention relates to an infinitely variable speed ratio gear drive with an output shaft which can be driven in either direction for interposition between a prime mover and a consumer, such as an automotive drive axle or a machine, wherein the power of the prime mover is transmitted to a planetary gear train consisting of sun gear, planet carrier with planet gears and internal gear via more than one power train and wherein an infinitely variable torque transmitting unit is provided in one of said power trains.

In a known gear drive of this type (German "Offenlegungsschrift"* No. 23 54 289), a prime mover drives a hydrostatic pump on the one hand and a hydrodynamic pump on the other hand. The hydrostatic pump drives a hydrostatic motor connected to the sun gear of the planetary gear train. The sun gear can be connected to the planet carrier of the planetary gear train by means of a clutch. The hyrodynamic pump drives a turbine of a Föttinger converter. This turbine by means of a brake.

* Offenlegungsschrift = printed publication of the unexamined application

The output of the complete arrangement is connected to the internal gear and leads to the automotive drive axle. The hydrodynamic converter can be bridged by means of a clutch provided between hydrodynamic pump and turbine, whereby a direct mechanical drive to the planet carrier is made possible. To reverse the direction of rotation, the driving connection between the prime mover and the planet carrier is disengaged and the planet carrier locked. The drive in the reverse direction is exclusively transmitted from the hydrostatic motor to the sun gear and from the sun gear to the internal gear via the planet gears of the fixed planet carrier. However, this is only possible with a very low drive power demand because an oversized hydrostatic drive power train would be required otherwise. It is a drawback of this known arrangement that it does not permit continuous transition through the zero point when reversing, since "shifting" procedures, viz. procedures to lock the planet carrier, are required at zero. Moreover, the power demand for the hydrostatic drive portion of this known arrangement, which must provide the total power for driving in reverse gear, is relatively high. Finally, it is also a drawback that with the hydraulic drive power trains engaged the efficiency of the arrangement is relatively poor compared with an arrangement whereby a substantial portion of the power is directly transmitted mechanically such as by other known infinitely variable speed gear drives. Thus, an arrangement is known (cf. journal "Maschinenmarkt", Vol. 74 (1968), No. 81, pages 1567–1570) whereby a substantial portion of the power flow is directly transmitted mechanically so that the power in the secondary train can be kept lower. However, the direction of rotation cannot be reversed with this prior art arrangement and the range of speed variation which can be accomplished economically is very limited, no more than 1:1.5 in the case of the example cited. Also known is an arrangement (German "Offenlegungsschrift" No. 24 09 333) wherein two hydraulic drives, viz. one hydrostatic drive and one hydrodynamic drive, are disposed in parallel relation and employed alternately without any need to interrupt the tractive power when changing from one drive to the other. In this case, however, the hydrostatic drive serves a range of operation intended for driving at constant slow speed and greatly varying tractive power, which means greatly varying torque, while the hydrodynamic train is employed for normal driving conditions. Finally, superimposed steering gears for crawler-type vehicles are known (German "Offenlegungsschrift" No. 20 53 698; Technische Rundschau No. 8 of Feb. 28, 1969, page 5) wherein a hydrostatic drive train acts on the individual track drives via a differential; a hydrodynamic drive train, followed by a speed-changing transmission, also acts on the individual track drives. The hydrostatic drive train is connected to the planet carrier of the planetary gear train and the hydrodynamic drive train is connected to the sun gear via the speed-changing transmission. The planet gears take the form of dual gears, such that no internal gear is used and the output is derived from the second sun gear, or the internal gear is driven by the hydrodynamic train via the speed-changing transmission and the planet carrier provides the output while the hydrostatic train is connected to the sun gear. In either case, the hydrostatic train merely serves to produce a relative rotation of the drives provided for the two tracks in order to enable the crawler-type vehicle to make turns.

It is the object of the present invention to design a gear drive of the type mentioned herein first above in such a manner that it will combine good efficiency with a large variable speed range and enable the direction of rotation to be reversed.

According to the invention, this object is accomplished by arranging a gear drive of the type mentioned herein above in such a manner that one drive power train is directly led to the sun gear mechanically, that the planet carrier is connected to the output and that the torque transmitting unit, whose output-end direction of rotation can be reversed, is coupled with the internal gear via an intermediate transmission.

It is a special advantage of the gear drive in accordance with this invention that it provides for a large variable speed range as well as reversing with continuous transition inasmuch as no "shifting" procedures are required at the point where the direction of rotation is to be reversed and reversal can be effected by simply changing the speed at the internal gear. Another advantage resides in the fact that a substantial portion of the power is transmitted, always, purely mechanically and, thus, with high efficiency, which improves the total transmission efficiency of the arrangement. Moreover, this gear drive can be readily designed so that within the range which is of interest for automotive applications the power train incorporating the torque transmitting unit will only have to transmit a small portion of the total power while the major portion of the power will be directly transmitted mechanically to the planetary gear train. Consequently, the overall efficiency will be very good even if the efficiency of the torque transmitting unit is not good, since in this case the overall efficiency mainly depends on the mechanical efficiency, which is always very high. With the aid of the torque transmitting unit, the internal gear can be driven in the same direction as the sun gear or in the opposite direction or, alternatively, be locked and held stationary. It is thereby possible, in an extremely simple manner, to achieve a particularly high efficiency, i.e. the purely mechanical efficiency obtained when the internal gear is fixed, as well as to reverse the direction of rotation of the output at sufficient speed by reversing the direction of rotation of, and driving, the internal gear.

Suitable torque transmitting units include, for example, electric transmitting means, such as motor-generator units. It is also possible to use a separate prime mover for the second power train instead of the torque transmitting unit. A particularly advantageous embodiment, however, has been found to be one wherein a hydraulic drive in the form of a hydrostatic drive is employed as torque transmitting unit. In this embodiment, the pump of the hydrostatic drive is driven by the prime mover and the hydraulic motor is driven via regulating means which control the discharge flow rate and/or discharge pressure. The hydraulic motor, in turn, acts on the internal gear via an intermediate gear. With a hydrostatic drive, the conditions required in cooperation with the other components of the drive arrangement can be met very well without any marked effect of the unfavorable efficiencies of certain zones on the overall efficiency of the arrangement. At the same time, infinitely variable speed control including reversal of the direction of rotation can be accomplished with the overall arrangement in accordance with this invention.

In many cases, the torque, speed and efficiency characteristics of the arrangement described above are sufficient to meet the operational and economical requirements. However, the infinitely variable speed gear drive of the present invention can be further improved, in a very simple manner, by providing a further power train and disposing it in parallel relation to the torque transmitting unit, thereby enabling that portion of the total power which flows through the torque transmitting unit to be reduced to the amount required for control purposes. A more expedient mode of transmission can then be selected for the excess portion. For this purpose, the further power train of a preferred embodiment of this invention takes the form of a hydrodynamic converter whose pump impeller is driven by the prime mover and whose turbine wheel is coupled to the internal gear of the planetary gear train. If, according to a further development of the invention, the hydrodynamic converter takes the form of a Trilok converter, then the stator bears against the housing via a free-wheeling system. This arrangement satisfies even exacting demands in terms of variable speed range as well as torque and efficiency.

Further details will become apparent from the following description of a gear drive in accordance with this invention, schematized in the accompanying drawing, in conjunction with the patent claims.

The drawing shows a schematic section.

A prime mover 1 drives a shaft 2 on which is splined a sun gear 3. Also mounted on the shaft 2 in a manner preventing it from turning in relation to the shaft is a gear 4 which engages a further gear 5 mounted on the shaft of a hydraulic pump 6 and transmitting to said pump a torque derived from the shaft 2.

The sun gear 3 engages planet gears 8 which are rotatably mounted on a planet carrier 7 and whose teeth also mesh with those of an internal gear 9. The gears 3, 8 and 9, together with the planet carrier 7, constitute a conventional planetary gear train. The planet carrier 7 is connected to an output shaft 10 which transmits its power through a splined bevel gear 11, for example, to a crownwheel 12 of an automotive axle drive (not shown).

The internal gear 9 engages a further gear 13 mounted on a shaft 14 in a manner preventing it from turning in relation to the shaft, said shaft 14 being driven by a hydraulic motor 15. The hydraulic motor 15 can be controlled in a manner known per se. It is connected to the hydraulic pump 6 via hydraulic lines 6 incorporating an interposed control unit 17. The hydraulic flow to the motor can be controlled by means of the said control unit 17. In addition, the hydraulic motor 15 is controllable itself, taking the form of an axial piston motor with adjustable swash-plate, for example.

A hydrodynamic converter 18 provides a further power split in addition to the power flow to the planet carrier 7 via the sun gear 3 and the power flow to the planet carrier 7 via the hydrostatic drive 6, 15, the gear 13 and the internal gear 9. For this purpose, a pump impeller 19 of the hydrodynamic converter 18 is connected to the shaft 2 by means of a disk 20 in a manner preventing it from turning in relation to said shaft. A turbine wheel 21 of the hydrodynamic converter 18 is connected to a hollow shaft 22, which concentrically surrounds the shaft 2, in a manner preventing it from turning in relation to said hollow shaft 22, which, on the other hand, is connected to the internal gear 9 by means of a disk or bell 23, thereby providing a further power train from the shaft 2 to the planet carrier 7. A stator 24 of the hydrodynamic converter 18 bears against the housing via a free-wheeling system 25.

With the aid of the drive arrangement described, the prime mover 1 can always be operated in the most favorable range, e.g. the most economical range or the range with the lowest exhaust gas emission or lowest noise level, while the output 10, 11, 12 can nevertheless be operated at any desired speed within a large variable speed range. The arrangement also enables the direction of rotation to be reversed. Speed control and reversing are effected by means of the hydrostatic drive 6, 15. Thus, if the hydrostatic drive is switched off and the internal gear 9 fixed thereby, all power is directly transmitted mechanically via sun gear, planet gears and planet carrier. The hydrodynamic converter 18 is preferably emptied in this mode of operation. The speed ratio expressed as ratio of the speed of the sun gear 3 to the speed of the planet carrier 7 is greater than the ratio of the number of teeth of the internal gear 9 to the number of teeth of the sun gear 3 by one. If the hydrodynamic converter 18 is filled and the gear 13 driven via the hydrostatic drive so that the internal gear 9, additionally driven via the hydrodynamic converter 18, rotates in the same direction as the sun gear, then the output rotation of the planet carrier has the same direction as the rotation of the sun gear and the speed of the planet carrier lies between the two speeds of sun gear and internal gear, corresponding to the ratio of their diameters or numbers of teeth. A special situation exists if the internal gear is driven at the same speed as the sun gear. In that case, the planet gears 8 are stationary in relation to the sun gear 3 and the internal gear 9 and the planet carrier 7 rotates at the same speed as sun gear 3 and internal gear 9. The speed of the planet carrier can be controlled by varying the speed of the internal gear. If the direction of rotation of the internal gear 9 is reversed (preferably with the hydrodynamic converter 18 emptied) by reversing the hydraulic motor 15, the speed of the planet carrier can be reduced down to zero and beyond, into the opposite direction of rotation.

It shall be understood that the present invention is not limited to the embodiment shown by way of example and that deviations therefrom are possible without exceeding the scope of this invention. In particular, it shall be understood that individual features of this invention may be employed either separately or jointly in combinations of a plurality of said features. Thus, the gear 13 may engage the internal gear 9, which takes the form of a ring gear, internally, meshing with the same teeth as the planet gears 8, or the internal gear 9 may be provided with an additional external tooth system, as shown, which is engaged by the gear 13.

I claim:

1. A variable speed ratio reversible gear drive for interposition between a prime mover such as an internal combustion engine or the like, and a consumer such as a drive axle or the like comprising a planetary gear system having a sun gear driven by said prime mover, a planet gear meshing with said sun gear and fixed to a carrier driving said consumer and an internal gear meshing with said planet gear, a variable speed torque transmission unit having an output driving said internal gear and a hydrodynamic converter having an impeller driven by said prime mover and a turbine driving said internal gear.

2. The gear drive according to claim 1 including a housing, said hydrodynamic converter having a stator and a free wheeling bearing system interposed between said stator and said housing.

3. The gear drive according to claim 1 wherein said torque transmission unit comprises a hydrostatic drive having a pump driven by said prime mover, a hydraulic motor driving said internal gear and control means interposed therebetween for regulating the output of said hydraulic motor.

4. The gear drive according to claim 3 including gear means coupling the output of said hydraulic motor to said internal gear, and shaft means directly coupling the turbine of said hydrodynamic converter to said internal gear.

* * * * *